United States Patent [19]

von Bonin et al.

[11] Patent Number: 5,693,260
[45] Date of Patent: Dec. 2, 1997

[54] TEMPERATURE-RESISTANT BONDING AND COATING AGENTS LOW IN FLUE GAS AND THE USE THEREOF

[75] Inventors: Wulf von Bonin; Gert Jabs, both of Odenthal, Germany

[73] Assignee: Bayer Aktiengesellschaft, Leverkusen, Germany

[21] Appl. No.: 372,634

[22] Filed: Jan. 13, 1995

[30] Foreign Application Priority Data

Jan. 21, 1994 [DE] Germany .................... 44 01 636.0

[51] Int. Cl.$^6$ .................... C09K 21/00; C09D 5/16
[52] U.S. Cl. .................... 252/606; 252/610; 106/18.12; 106/18.16
[58] Field of Search .................... 106/629, 190, 106/18.12–18.19; 252/600–617

[56] References Cited

U.S. PATENT DOCUMENTS

| 3,414,374 | 12/1968 | Stossel | 23/105 |
| 3,945,987 | 3/1976 | Stossel | 106/18.18 |
| 4,076,540 | 2/1978 | Stossel | 106/18.16 |
| 5,053,148 | 10/1991 | von Bonin | 106/18.18 |
| 5,182,049 | 1/1993 | von Bonin | 106/18.11 |
| 5,328,719 | 7/1994 | von Bonin | 106/18.13 |
| 5,425,901 | 6/1995 | von Bonin et al. | 106/18.15 |
| 5,543,230 | 8/1996 | von Bonin et al. | 428/232 |

OTHER PUBLICATIONS

Analytical Chemistry, vol. 28, No. 12 (Dec. 1956) pp. 1981–1983.

*Primary Examiner*—Gary P. Straub
*Attorney, Agent, or Firm*—Sprung Kramer Schaefer & Briscoe

[57] ABSTRACT

Film-forming, temperature-resistant bonding and coating agents-low in flue gas which are composed of aqueous sols of silicic acid and of amine salts of acid metal phosphates, optionally mixed with amine salts of boric acid, and the in use.

9 Claims, No Drawings

TEMPERATURE-RESISTANT BONDING AND COATING AGENTS LOW IN FLUE GAS AND THE USE THEREOF

The present invention relates to temperature-resistant bonding and coating agents low in flue gas which are composed of aqueous sols of silicic acid and amine salts of acid metal phosphates, and the use thereof.

Aqueous sols of colloidal silicic acids have been known for a long time. These sols are occasionally used as bonding or coating agents, although they do not form films during the drying process, which is a great disadvantage. The advantage of using a colloidal silicic acid is that it is stable to temperature, so that from it a layer can be produced which is resistant to high temperatures. Since however aqueous silica sols, as is generally known, are sensitive to electrolytes and may, for example, flocculate even on the addition of small quantities of electrolytes, the use of colloidal silicic acids, particularly for coating or as bonding agents, was considered only in exceptional cases and under specific circumstances.

The object of the invention is therefore to provide silicic acid systems for use as bonding agents or for coating, where the said systems are not only temperature-resistant but also form films and are low in flue gas, i.e. evolve little or no gas upon heating.

Surprisingly, this object is fulfilled by using aqueous, optionally colloidal silica sols which contain in addition amine salts of acid metal phosphates, or amine salts of acid metal phosphates together with amine salts of boric acid. In spite of adding these electrolytes, no flocculation is observed. Mixtures of low viscosity are obtained which possess film-forming properties and moreover are clear on drying.

The invention provides temperature-resistant bonding and coating agents low in flue gas and stable in storage, composed of aqueous sols of colloidal silicic acid, which are characterized in that they contain in addition amine salts of acid metal phosphates or a mixture of amine salts of acid metal phosphates and of boric acid.

Preferably aqueous silica sols are used whereof the particles have specific surfaces (determined by the BET method and the method of G. N. Sears, Analytical Chemistry, Vol. 28, No. 12, 1981–1983, December 1959) of from 50 to 500 $m^2/g$, particularly preferred from 100 to 300 $m^2/g$, and solids contents of from 10 to 55% by weight, preferably 20 to 45% by weight.

The amine salts used are preferably alkanolamine salts, particularly preferably monethanolamine salts and/or polyethanolamine salts of boric acid and of acid metal phosphates.

Acid phosphates of metals of the second and third main groups and the second subgroup of the periodic table of elements, in particular Mg, Ca, B, Al, Zn, are preferred. Acid phosphates of metals generally have a pH value of less than 6.

Aqueous solutions of alkanolamine salts of the acid phosphates of aluminum are particularly preferred, optionally in combination with alkanolamine salts of boric acid, which have pH values of approximately 7.

The bonding and coating agents preferably contain mixtures of amine salts of boric acid and of acid metal phosphates in an atomic ratio of metal, preferably aluminum, to boron of 1:0 to 1:12, preferably 1:0.1 to 1:6.

The invention also provides a method for preparing the bonding and coating agents according to the invention, which is characterized in that aqueous silica sols are intimately mixed with aqueous solutions of amine salts of acid metal phosphates or a mixture of amine salts of acid metal phosphates and of boric acid.

The aqueous solutions of the amine salts of the acid metal phosphates used preferably have a pH value of between 5 and 8, particularly between 6 and 7.5.

The aqueous silica sols, whereof the particles have specific surfaces preferably of from 50 to 500 $m^2/g$, particularly of from 100 to 300 $m^2/g$, and which possess solids contents of from 10 to 55% by weight, particularly 20 to 45% by weight, are mixed with the aqueous solutions of the amine salts of acid metal phosphates, or with the aqueous solutions of the amine salts of acid metal phosphates and of boric acid, preferably at 3° C. to 100° C., particularly between 10° C. and 40° C.

25% to 85% by weight, particularly 45% to 80% by weight, aqueous solutions of alkanolamine salts of acid metal phosphates, or of mixtures of alkanolamine salts of acid metal phosphates and of boric acid, are preferred.

The aqueous bonding and coating agents according to the invention are employed as adhesives or as bonding, impregnating or coating agents for organic, inorganic or mineral parts or particles which may be filamentous, spherical, flaky, dumb-bell shaped, crystalline or pulverulent, solid or porous, in lump form, hollow, foamed or in sheets.

The aqueous bonding or coating agents according to the invention are also employed as binders for the preparation from the above-mentioned particles of optionally compressed or pressed structural parts, wherein the structural parts may be subsequently dried and then optionally heated (for example, at temperatures of from 80° to 1100° C., preferably from 150° C. to 700° C.).

The bonding and coating agents according to the invention are preferably used as binders for expandable or expanded particles of metals, carbon, graphite, expanded graphite, clay, perlite, vermiculite, glass, mica, borosilicate, wood, cork, skins and seeds of fruit, starch products, protein products or synthetic cellulose formulations.

The particles modified by the bonding and coating agents according to the invention or the composites produced therefrom find applications in fire prevention, in the construction of machinery and apparatus, in overground and underground working, in the insulation and maintenance of systems for conducting heat and current, and in shielding electromagnetic effects.

The aqueous bonding and coating agents according to the invention have the advantage that they can be used even at very high temperatures up to 1200° C., at the same time they have good film-forming properties and, surprisingly, do not flocculate despite higher concentrations.

The aqueous silica sols used are commercially available silica sols. These are generally prepared by ion-exchange treatment of dilute alkaline silicate solutions and, depending on the manner of conducting the process, have particle surfaces of from 50 to 500 $m^2/g$ and concentrations in the range of from 10 to 50% by weight. The said sols have a pH value of 7 to 8.

Acid salts of orthophosphoric acid are preferably used as acid metal phosphates. However, pyrophosphates or polyphosphates and other acid salts of polyvalent acids of phosphorus and mixtures of different phosphoric acids may also be used.

The acid metal phosphates are preferably acid orthophosphates of aluminum. They are obtained, for example, by reacting 1 mole of aluminum hydroxide with more than one mole of orthophosphoric acid, preferably with from 1.5 to 3 moles of phosphoric acid.

Although it is possible to operate without the concomitant use of the amine salts of boric acid, the latter are however preferably used, because in the event of a subsequent reaction taking place at high temperatures in the bonding agents according to the invention, they can improve the stability and neutrality of the bonding by forming borophosphates. For reasons of stoichiometry, preferably 0 to 12 boron atoms, particularly preferably 0.1 to 6 boron atoms, are used per atom of aluminum.

Orthoboric acid ($B(OH)_3$) is preferably used. However, boric oxides and the hydration products thereof, and other boron compounds from which boric acids can be formed in an aqueous medium, are also suitable.

Besides ammonia and hydrazine, in principle all water-soluble amines are suitable as amines, or optionally mixtures of amines. It is however preferable to use aliphatic alkanolamines, which are obtainable, for example, by reacting ammonia or primary or secondary amines with epoxides, for example, propylene oxide or ethylene oxide, according to prior art. The alkanolamines may be primary, secondary or tertiary, for example, mono-, di- or tripropanolamine or -ethanolamine; a particularly preferred amine is monoethanolamine.

The above-mentioned solutions of amine salts are suitably prepared by first dissolving the boric acid, optionally in the presence of water, with the whole of the quantity of amine to be used and then in turn reacting the amine solution with the aqueous solution of the acid metal phosphate at from approximately 10° C. to 120° C., preferably 30° C. to 100° C. with thorough mixing, whereby a clear solution is formed which remains clear on drying. The quantity of amine is calculated so that at room temperature the aqueous solution of amine salts has a pH value of from 5 to 8, preferably of from 6.5 to 7.5, particularly 7. Such solutions, particularly those containing boron, with solids contents of from 25 to 85% by weight, preferably of from 45 to 80% by weight, are distinguished by being very stable in storage.

The silica sols are suitably combined with the solutions of amine salts by preparing the amine salt solution at between 3° C. and 100° C. and adding the silica sol with intimate mixing.

A stable, light opaque preparation is formed, the solids content whereof is adjusted preferably to between 20 and 70% by weight, particularly between 30 and 70% by weight. The $SiO_2$ content of the solids is preferably from 0.1 to 80% by weight, particularly from 20 to 60% by weight. The solutions thus obtained on drying mostly form a film and are as clear as water, especially if silica sols having particle surfaces of more than 150 m²/g are used.

The agents dried at 20° C. to 150° C. frequently have a thermoplastically workable character at temperatures of between approximately 120° C. and 200° C., especially if the $SiO_2$ content is less than 60% by weight, so that solid and/or porous molded parts having a glasslike nature can be produced therefrom by pressing or extrusion.

The bonding and coating agents according to the invention become insoluble in water on being heated to above approximately 200° C., preferably above 250° C., and do not melt even at temperatures of up to 1100° C., but only in the temperature range up to approximately 300° C. can they still soften slightly.

If powders or granular materials made from bonding agents dried at between room temperature and approximately 200° C. are rapidly heated to temperatures above 250° C., preferably to between 350° C. and 900° C., or subjected to gas flames, then owing to considerable intumescence, foam particles or hollow beads are formed which can be used, for example, for shock absorption, but particularly for insulation and fire prevention purposes, because they have low fire loads.

Because of their intumescent behavior the agents according to the invention are therefore used, for example, in the form of optionally reinforced molded parts, in the form of composites of for example, expandable or expanded particles of perlite, vermiculite, pumice, clays, glass, graphite, etc., bonded with the agents, in the coating or impregnation of nonwoven fabrics, woven fabrics, knitted fabrics, rigid or flexible foams, or more or less absorbent substrates such as, for example, glass, concrete, gypsum, wood, cardboard, plastics, etc., as an additive to water for fire fighting or as structural elements or components of structural elements for the purposes of fire prevention, whether for cables, packing materials, mortars, sealing or filling materials, packing for pipes, coverings, barriers to flue gases or insulating materials.

Since the bonding and coating agents according to the invention are highly temperature-resistant, and since even when mixed in high proportions with graphites, metallic powders or metallic granular materials, they only slightly impair the capacity thereof to conduct heat and electric current, they have a variety of possible applications in the construction of apparatus, for example, in heating technology as well as for shielding against electromagnetic influences or for discharging undesirable voltages.

Thus, for example, fully expanded expandable graphite (so-called expanded graphite) and the bonding agents according to the invention present, for example, in 60% by weight aqueous solution, may be made into mixtures in the solids ratio of 1:1. The said mixtures may be molded and dried and also tempered at approximately 270° C. A formed body having a bulk density of less than 500 g/l is obtained, which has excellent electrical conductivities at high mechanical strengths and can be employed, for example, in the form of a plate as a heat-conducting sandwich element, or as an installed structural element which shields against electromagnetic influences, prevents the passage of sound and fire, and is still capable of intumescence should the occasion arise.

The invention is illustrated in the following examples. The parts and percentages given refer to weight, unless stated otherwise. The surface data refer to values which were established by the BET method or the method of G. N. Sears.

EXAMPLES

Preparation of an Al phosphate solution (A)

78 parts (1 mole) of $Al(OH)_3$ and 196 parts (2 moles) of orthophosphoric acid are stirred thoroughly at 80° C. with 202 parts of water to form a 50% solution. The solution is then introduced into a 50% solution of 3.5 moles of ethanolamine in water, also with thorough mixing, and stirring is continued at 80° C. for approximately 1 hour. A largely clear, 50% solution of the aluminum phosphate-ethanolamine salt is formed having a pH value of approximately 7.5.

Example 1

200 parts of the solution A are prepared at 30° C. 200 parts of 30%, commercial silica sol having an average particle surface of approximately 150 m²/g are then added with thorough stirring. A light opaque, stable product solution (1) is formed, which on drying produces a homogeneous, almost clear, glasslike film.

If the dried material is exposed to the flame from a Bunsen burner, it intumesces. However, if it is heated slowly in an oven at a rate of 1° C./min, no intumescence is observed even at high temperatures.

Preparation of a solution of a boron-containing Al phosphate amine salt (B)

692 parts of 85% o-phosphoric acid (6 moles), 165 parts of water and 156 parts of aluminum hydroxide (2 moles) are made up into a solution by stirring at 80° C.

The solution is then introduced into a solution of 185.4 parts of $B(OH)_3$ in 370 parts of monoethanolamine with thorough stirring at 80° C. After further stirring for 1 hour at 80° C. and subsequent cooling, a clear, approximately 76% solution of the boron-containing amine salt having a pH value of approximately 6 is obtained; the pH value is adjusted to 7 by means of monoethanolamine.

Example 2

100 parts each of a 30% silica sol having a particle surface of
a) 100 m²/g,
b) 200 m²/g and
c) 300 m²/g
are introduced respectively into 100 parts of the 76% salt solution B at room temperature with intimate mixing. A stable, that is, non-flocculating, opaque product solution is formed in each case (2a–c).

Example 3

As in Example 2, 25 parts of a 30% silica sol having a particle surface of approximately 220 m²/g are added to 75 parts of the solution B. An almost clear, stable product solution (3) having a solids content of 64.5% is obtained.

Example 4

As in Example 3, 50 parts of the identical silica sol are intimately mixed with 50 parts of the solution B. A light opaque product solution (4) having a solids content of 53% is obtained.

Example 5

As in Example 3, 75 parts of the identical silica sol are intimately mixed with 25 parts of the solution B. A light opaque product solution (5) having a solids content of 41.5% is obtained.

The product solutions 3, 4 and 5 dry at between 80° C. to 120° C. to form almost clear films.

Example 6

A cotton fiber cloth (600 m²/g) is completely saturated in the product solution 2a, then squeezed out and the moist material cut into strips 6 cm in width and sealed watertight in polyethylene film. After being stored for 6 months, the material is removed from the wrapping and wound round a polypropylene tube to form three layers. The material (binding) stiffens during drying. The tube is then exposed to the flame of a natural gas burner at the position of the wound material. It is apparent that at the position of the wound material the tube construction survives even after 30 minutes, whereas adjacent to the position of the wound material the tube is melted by the heat.

Such bindings based on nonwoven or woven fabrics can be employed to protect the structure of plastic parts in the event of fire.

Example 7

A piece of cardboard is coated with the product solution 1 until saturated and the coating or impregnation thus produced is dried. The coated side of the cardboard is then exposed to the flame of a natural gas burner. The cardboard treated with the product solution is merely carbonized and not destroyed; the coated side exposed to the flame survives. Fire-resistant cardboard boxes can be produced in this manner.

Example 8

An aromatic polyamide fiber (Kevlar fiber) is completely saturated in the product solution 2c and dried at 100° C. The identical process is repeated. After drying at 100°–160° C., the rigid sheet of material thus obtained is composed to the extent of approximately 50% of the bonding agent according to the invention. The flat material is then placed in a press that has been preheated to 400° C. and pressed to form a hemispherical shell. The shell obtained is resistant to the action of flames and water and has a ceramic character. This example demonstrates that the impregnation gives rise to thermoplastic workability.

Example 9

100 parts of expanded graphite ($SO_x$ type) are mixed with 100 parts of the product solution 2b and dried. The expanded graphite modified in this manner is then placed in a sheet steel flat mold lined with aluminum foil and having a capacity of 1000 parts by volume, and the whole is placed in an oven that has been preheated to 600° C. After 1 hour the steel mould is removed from the oven, cooled and opened. A mechanically stable light graphite plate has formed which has a bulk density of approximately 90 g/l and remains intact even after being heated for 30 minutes with a natural gas burner. It conducts electricity.

Example 10

A plywood panel glued with phenolic resin is completely coated with the product solution 3 and dried at between 120° C. and 150° C. The panel surface, thus provided with a coating approximately 0.5 mm in thickness, is then heated with a natural gas burner. A layer up to 10 mm thick of insulating and fire-resistant intumescent foam is formed, behind which the wood is protected against burning through.

Example 11 (Control example)

100 parts of graphite treated, that is, fully expanded, at 650° C., are mixed with 330 parts of the silica sol used in Example 4 and Example 5. The moist mass is then placed in a brick mold and dried, and the brick obtained after drying is tempered in an oven with the temperature being elevated at a rate of 1° C./min from room temperature up to 350° C. After tempering an expanded graphite brick is obtained which disintegrates even under a light mechanical load, for example, pressing with the finger.

Example 12

The method described in Example 11 is followed, but instead of the pure silica sol the identical quantity by weight of solids (190 parts) of product solution 4 is used.

A mechanically stable brick is obtained having a good resistance, that is, an indentation resistance of above 15 kg/cm² at a bulk density of approximately 250 g/l and an electrical resistance of less than $7.8 \times 10^{-3}$ ohm/cm³.

Example 13

100 parts of commercial hollow glass beads having a bulk density of approximately 150 g/l and particle diameters of less than 1 mm are mixed into a paste with 100 parts of the product solution 5, introduced into a brick mold and there lightly compressed. Drying is conducted at 120° C., then the composite is removed and fired at 400° C. A stable, water-resistant, light composite is obtained which has a bulk density of approximately 150 g/l, is flame-resistant and virtually free of flue gases on being heated with a flame, and is suitable for insulation and sound absorption purposes.

Example 14

50 parts of an $SO_x$ expanded graphite, which has been treated at 290° C. and is therefore only partially expanded, is stirred into a paste with 250 parts of the product solution 4. This paste is used in cartridges and can be pressed into safety joints, where it sets on drying. On being heated with a flame, the joint thus secured swells the contained expanded graphite and at the same time the bonding agent forms a ceramic stabilizing cover.

From the standard temperature curve according to DIN 4102, a filled joint 3 cm wide and 3 cm deep preserves its shape even after heating with a flame for four hours.

Example 15

A disc 2 cm in thickness is cut from the tempered brick obtained in Example 12. The disc is covered with 2 aluminum oxide ceramic plates, each 1 mm thick. The supporting sides of both the cover plates had been coated beforehand with the product solution 3. The sandwich obtained in this way is then heated to 260° C. in a heatable press for 30 minutes, whereby the ceramic cover plates are fixed. The sandwich obtained in this way has an electrically conducting, light inner layer and two insulating covering layers. It is suitable as a structural element for electromagnetic shielding purposes.

Example 16

100 parts of tempered aluminum oxide powder which is commercially available for use as a ceramic oxide are kneaded into a paste with 30 parts of the solution from Example 2c and formed into a plate. The plate is dried at 120° C. and then heated to 300° C. with a temperature rise of 1° C./min. A stable, virtually ceramic plate is obtained which can be used for electrical insulation purposes or as a basic plate material for electronic structural elements.

Example 17

A thick woven glass fiber in the form of a cloth is completely saturated in the solution from Example 2c and dried at 150° C. The preliminary formed body thus obtained is then pressed in a heated plate press at approximately 100 bar and 300° C. for 30 minutes. A stable, virtually ceramic plate is obtained which can be used as a basic material in the assembly of electrical structural elements.

The plates obtained in Examples 16 and 17 can be subjected to further ceramic treatment by tempering at 1200° C. in air. A colorless material is obtained which can also be used as a structural element in electrical apparatus.

It will be appreciated that the instant specification and the claims are set forth by way of illustration and not limitation, and that various modifications and changes may be made without departing from the spirit and scope of the present invention.

We claim:
1. A bonding and coating composition comprising
   (1) an aqueous colloidal silica sol;
   (2) the reaction product of an acidic metal phosphate, wherein the metal of the acid metal phosphate is Mg, Ca, B, Al or Zn, with ammonia, hydrazine or an amine, and
   (3) the reaction product of boric acid with ammonia, hydrazine or an amine.

2. The bonding and coating composition of claim 1, wherein the reaction product (3) is an amine salt of boric acid wherein the amine is a primary, secondary or tertiary amine or an aliphatic alkanolamine, and the reaction product (2) is an ammonium salt, a hydrazine salt, a primary, secondary or tertiary water soluble amine salt or an aliphatic alkanolamine salt.

3. A bonding and coating agent according to claim 1, wherein the silica sol comprises particles having a specific surface from about 50 to 500 $m^2/g$.

4. A bonding and coating agent according to claim 1, having a solids content from about 20 to 70% by weight.

5. A bonding and coating agent according to claim 1; wherein the silica sol comprises particles having a specific surface from about 100 to 300 $m^2/g$ and the metal of the acid metal phosphate is selected from the group consisting of Mg, Ca, B, Al and Zn, the agent having a solids content of from about 30 to 70% by weight.

6. A method for preparing a bonding and coating agent according to claim 1, which comprises intimately mixing said aqueous silica sol with an aqueous solution of an amine reaction product with said acidic metal phosphate or a mixture of an amine salt of an acid metal phosphate and boric acid.

7. The method according to claim 6, wherein the aqueous solution of said amine reaction product with said acidic metal phosphate, or of a mixture of an amine reaction product with said acidic metal phosphate and boric acid has a solids concentration of about 25 to 85% by weight.

8. The method according to claim 6, wherein the aqueous silica sol has a solids concentration of about 10 to 55% by weight.

9. The method according to claim 7, wherein the aqueous solution of the amine reaction product with said acidic metal phosphate has a concentration of about 45 to 80% by weight and the aqueous silica sol has a solids concentration of about 20 to 45% by weight.

* * * * *

UNITED STATES PATENT AND TRADEMARK OFFICE
CERTIFICATE OF CORRECTION

PATENT NO. : 5,693,260
DATED : December 2, 1997
INVENTOR(S) : von Bonin, et al.

It is certified that error appears in the above-identified patent and that said Letters Patent is hereby corrected as shown below:

Col. 8, line 31   Delete " salt of a acid " and insert
                  -- reaction product with said acidic --

Col. 8, line 40   Delete claim " 7 " and substitute -- 6 --

Signed and Sealed this

Twenty-third Day of February, 1999

Attest:

Q. TODD DICKINSON

Attesting Officer    Acting Commissioner of Patents and Trademarks